United States Patent [19]

Katayama et al.

[11] Patent Number: 4,826,126
[45] Date of Patent: May 2, 1989

[54] FLUID-FILLED ELASTIC MOUNTING STRUCTURE

[75] Inventors: Motohiro Katayama, Kasugai; Tatsuya Sukuki, Komaki, both of Japan

[73] Assignee: Tokai Rubber Industries, Ltd., Aichi, Japan

[21] Appl. No.: 227,659

[22] Filed: Aug. 3, 1988

[30] Foreign Application Priority Data

Aug. 11, 1987 [JP] Japan .................. 62-200378

[51] Int. Cl.$^4$ ........................................... F16M 13/00
[52] U.S. Cl. ..................... 248/562; 248/636; 248/638; 267/140.1
[58] Field of Search ............. 248/636, 638, 659, 562; 267/140.1, 219; 123/192 R; 180/300

[56] References Cited

U.S. PATENT DOCUMENTS

| | | | |
|---|---|---|---|
| 4,650,168 | 3/1987 | Andra | 267/140.1 |
| 4,657,219 | 4/1987 | Kakimoto | 248/562 |
| 4,721,292 | 1/1988 | Saito | 267/140.1 |
| 4,757,982 | 7/1988 | Andra | 248/562 R |
| 4,762,309 | 8/1988 | Hutchins | 248/636 X |
| 4,767,107 | 8/1988 | Fol | 267/140.1 |
| 4,779,585 | 10/1988 | Behrens et al. | 123/192 R |

Primary Examiner—J. Franklin Foss
Attorney, Agent, or Firm—Oliff & Berridge

[57] ABSTRACT

A fluid-filled elastic mount including a first support member and second support member, an elastic body interposed between the first and second support members, a closure member for partially defining a fluid chamber filled with a non-compressible fluid, a partition device for dividing the fluid chamber into a pressure-receiving chamber and an equilibrium chamber, a device for defining a restricted passage for restricted fluid communication between the pressure-receiving and equilibrium chambers, and a movable member which is supported deformably or displaceably in a load-receiving direction. The elastic mount further includes an operating device having a cup-shaped member for dividing the pressure-receiving chamber into a first section on the side of the first support member and a second section on the side of the partition device. The cup-shaped member cooperates with the elastic body to define an annular restricted portion which communicates with the first and second sections. The operating member further has an elastic member, and a resonance member elastically supported by the elastic member and having a first communication hole.

6 Claims, 2 Drawing Sheets

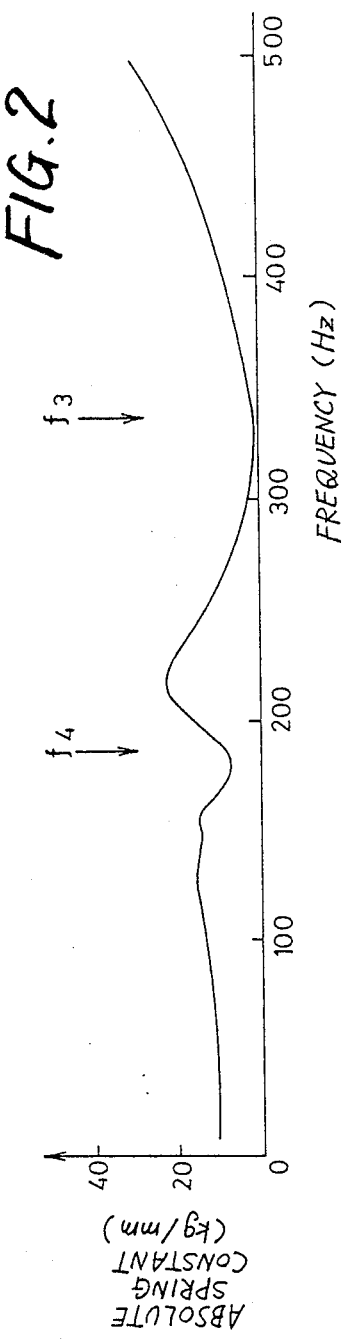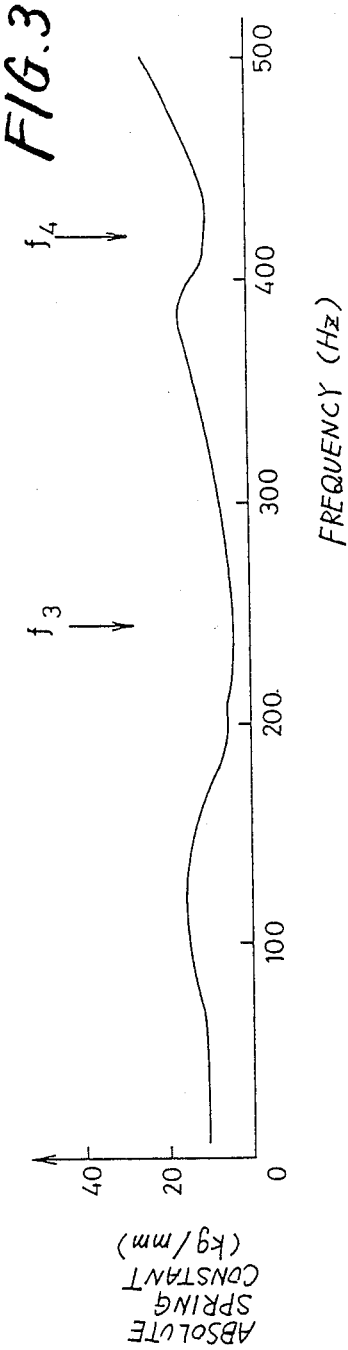

FLUID-FILLED ELASTIC MOUNTING STRUCTURE

BACKGROUND OF THE INVENTION

1. Field of the Invention

The present invention relates in general to a fluid-filled elastic mounting structure suitably used as a mount to mount for example an engine of a motor vehicle, and more particularly to such a fluid-filled mounting structure capable of effectively damping and isolating input vibrations in a wider frequency range than the known structure.

2. Discussion of the Prior Art

An elastic mounting structure such as an engine mount for an automotive vehicle is generally required to effectively damp and isolate input vibrations in a wide frequency range, in particular, to effectively damp the vibrations having low frequencies. To meet these requirements, there has been proposed a so-called fluid-filled elastic mount comprising: (a) first support means and second support means which are spaced apart from each other in a load-receiving direction in which a vibrational load is applied to the elastic mount; (b) an elastic body interposed between the first and second support means, for elastic connection of the first and second support means; (c) a closure member secured to the second support means and cooperating with at least the elastic body to define a fluid chamber filled with a non-compressible fluid, the closure member including a flexible portion; (d) partition means for dividing the fluid chamber into a pressure-receiving chamber formed on the side of the first support means, and an equilibrium chamber formed on the side of the second support means, (e) means for defining a restricted passage for restricted fluid communication between the pressure-receiving chamber and the equilibrium chamber.

In the known fluid-filled elastic mount constructed as described above, vibrations applied to the mount cause the non-compressible fluid to flow between the pressure-receiving chamber and the equilibrium chamber, through the restricted passage, so that the elastic mount can effectively damp the input vibrations in a specific frequency range which is determined by the configuration and dimensions of the restricted passage. Usually, the restricted passage is tuned to a certain frequency in a low frequency range so that the low frequency vibrations can be effectively damped due to restricted fluid flows through the restricted passage.

Although the known fluid-filled elastic mount can effectively damp the low frequency vibrations by the restricted passage, it cannot always sufficiently damp and isolate the input vibrations in other frequency ranges, in particular, in a higher frequency range than the frequency range determined by the restricted passage. More specifically, where the known elasic mount is subjected to the higher frequency vibrations, the fluid is less likely to flow through the restricted passage, leading to reduced damping or isolating capability of the elasic mount.

In view of the above inconvenience encounterd on the known elasic mount, there has also been proposed a fluid-filled elastic mount constructed as described above, further comprising (g) a movable member which is supported deformably or displaceably in a direction to absorb a pressure difference between the pressure-receiving and equilibrium chambers. According to the thus constructed elastic mount, the input vibrations in a specific frequency range can be effectively isolated, based on deformation or displacement of the movable member corresponding to the amount of the above-described pressure difference. Since the specific frequency range which is determined by the size and configuration of the movable member is set to a relatively high frequency range, the elastic mount can exhibit excellent isolating characteristic for the relatively high frequency vibrations.

Consequently, the elastic mount as described just above can effectively damp and isolate the input vibrations of two different frequency ranges, that is, the low frequency range determined by the restricted passage and the relatively high frequency range determined by the movable member. However, the known elasic mount cannot demonstrate excellent isolating characteristics for the vibrations in a frequency range which is higher than the specific frequency range determined by the movable member. More specifically, the elastic mount having the movable member can isolate the input vibrations whose frequencies are at most 150–200 Hz, but does not have sufficient isolating capability against the vibrations in a higher frequency range than the above-indicated range of 150–200 Hz.

SUMMARY OF THE INVENTION

It is accordingly an object of the invention to provide a fluid-filled elasic mount capable of damping and isolating applied vibrations in a wide frequency range, in particular, in a considerably high frequency range.

The above object may be accomplished according to the principle of the present invention, which provides a fluid-filled elastic mount for flexible coupling of two members, comprising (a) first support means and second support means which are spaced apart from each other in a load-receiving direction in which a vibrational load is applied to the elastic mount, (b) an elastic body interposed between the first and second support means, for elastic connection of the first and second support means, (c) a closure member secured to the second support means and cooperating with at least the elastic body to define a fluid chamber filled with a non-compressible fluid, the closure member including a flexible portion, (d) partition means for dividing the fluid chamber into a pressure-receiving chamber formed on the side of the first support means, and an equilibrium chamber formed on the side of the second support means, (e) means for defining a restricted passage for restricted fluid communication between the pressure-receiving and equilibrium chambers, (f) a movable member which is supported deformably or displaceably in a direction to absorb a pressure difference between the pressure-receiving and equilibrium chambers, and (g) an operating device. The operating device includes a cup-shaped member which has an opening and which is fixedly supported by the first support means such that the opening is open toward the partition means. The cup-shaped member of the operating device is adapted to divide the pressure-receiving chamber into a first section formed on the side of the first support means and a second section formed on the side of the partition means, and to cooperate with an inner wall surface of the elastic body to define an annular restricted portion which communicates with the first and second sections. The operating device further includes an elastic member supported by the cup-shaped member, and a resonance member elastically supported by the elastic member. The elastic and resonance members of the operating device are positioned so as to close the opening of the cup-shaped member, to thereby define a cavity which constitutes a part of the second section. While the resonance member has first communication means for fluid communication means between the cavity and the second section, the cup-shaped member has second communication means for fluid communication between the cavity and the first section.

In the fluid-filled elastic mount of the invention constructed as described above, the low frequency vibrations are effectively damped, based on the fluid flows through the restricted passage which is tuned to a certain low frequency value, and the relatively high frequency vibrations are effectively isolated, based on the deformation or displacement of the movable member which is suitably dimensioned, as in the known fluid-filled elastic mount.

Further, the elasic mount of the invention has the annular restricted portion which is defined by the cup-shaped member of the operating device and the inner wall surface of the elastic body, and which communicates with the first and second sections of the pressure-receiving chamber. Upon application of a vibrational load to the mount, the first support means and second support means are moved relative to each other in the load-receiving direction, which causes the non-compressible fluid in the pressure-receiving chamber to flow between the first and second sections thereof, through the annular restricted portion described above. Accordingly, the present elasic mount can effectively isolate the input vibrations in a specific frequency range which is determined by the configuration and dimensions of the restricted portion, based on resonance of the fluid mass in the restricted portion.

Furthermore, the operating device of the elastic mount according to the present invention has the elastic member and the resonance member supported by the elastic member. When the vibrational load is applied to the elastic mount, the non-compressible fluid in the pressure-receiving chamber is caused to flow between the cavity defined by the elastic member and resonance member, and the second section of the pressure-receiving chamber, through the first communication means formed in the resonance member. At the same time, the resonance member supported by the operating device via the elastic member is oscillated. Thus, the elasic mount can effectively isolate the input vibrations in a specific frequency range, due to the synergistic effect of resonance of the fluid mass flowing through the first communication means and resonance of the resonance member.

In consequence, the present elastic mount can effectively damp and isolate the input vibrations in four different frequency ranges, including those in two different frequency ranges which can be attenuated by the known elastic mount. Hence, the elastic mount according to the present invention can exhibit excellent damping and isolating characteristics for the vibrations in a wider frequency range than the known elastic mount.

Described more specifically, the specific frequency value to which the annular restricted portion is tuned and that to which the first communication means and the resonance member are tuned can be set to be higher than the frequency value to which the movable member is tuned. Therefore, the present elastic mount can demonstrate excellent isolating characteristics for the vibrations in a considerably high frequency range, especially, those having frequencies of more than 150–200 Hz, for which the known elastic mount having the movable member has insufficient isolating capability.

According to one advantageous feature of the invention, the operating device further comprises a retainer member through which the elastic member is supported by the cup-shaped member.

According to another advantageous feature of the invention, the partition means incorporates the means for defining a restricted passage for restricted fluid communication between the pressure-receiving and equilibrium chambers. In this case, the partition means may comprise two partition members which cooperate with each other to define the restricted passage. Further, the partition means may comprise the two partition members which define a generally flat space in which the movable member is accommodated movably in the load-receiving direction.

According to a further advantageous feature of the invention, the cup-shaped member includes a fixing portion secured to the first support means, and a cup-shaped portion supported by the fixing portion. The cup-shaped portion has a bottom wall which cooperates with the fixing portion and the elastic body to define the first section of the pressure-receiving chamber. The bottom wall has the second communication means.

BRIEF DESCRIPTION OF THE DRAWINGS

The above and other objects features and advantages of the present invention will become more apparent by reading the following description of its presently preferred embodiments of the invention, when considered in connection with the accompanying drawings, in which:

FIG. 2 is a graph illustrating the relationship between the absolute spring constant of the instant engine mount of FIG. 1 and the frequency of vibrations applied to the mount.

FIG. 3 is a graph corresponding to the graph of FIG. 2, according to another embodiment of the invention.

DESCRIPTION OF THE PREFERRED EMBODIMENT

Figure 1:
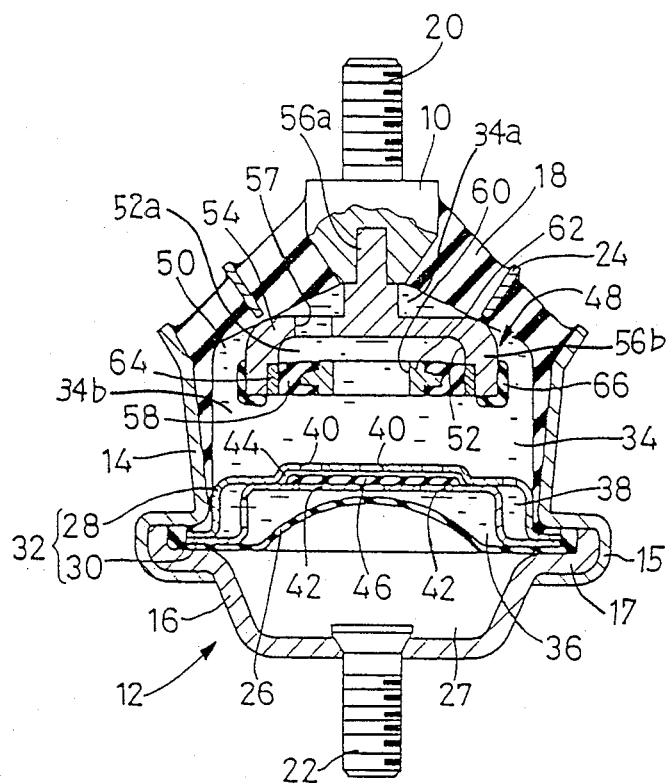
FIG. 1 is an elevational view in cross section of one embodiment of a fluid-filled elastic mount of the invention in the form of an engine mount for a motor vehicle.

Referring first to FIG. 1, there is shown one embodiment of the fluid-filled elastic mount according to the principle of the present invention, as applied to an engine mount for a motor vehicle. In the figure, reference numerals 10 and 12 respectively designate first support means in the form of a first metal support, and second support means in the form of a second support structure also made of a metal. The first metal support 10 and second support structure 12 are spaced apart from each other by a suitable distance, in mutually facing relationship in a load-receiving direction in which a vibrational load is applied to the engine mount.

The first metal support 10 has two portions consisting of a cylindrical base and a truncated cone which extends from the base toward the second support structure 12. Namely, the first metal support 10 is positioned such that a top surface of the truncated cone faces the second support structure 12. On the other hand, the second support structure 12 consists of a cylindrical support member 14 and a dished protective member 16, which have a considerably larger diameter than that of the cylindrical base of the first metal support 10. The cylindrical support member 14 has a flange 15 at one of its axial ends, while the dished protective member 16 has a flange 17 which extends radially outwardly from an open end thereof. The flange 15 of the cylindrical support member 14 is fluid-tightly caulked against the flange 17 of the dished protective member 16, such that the two members 14, 16 are assembled into a cup-shaped structure which is open on the side of the first metal support 10. The cup-shaped second support structure 12 is held in co-axial relationship with the first metal support 10.

The engine mount further includes an elastic body in the form of a cylindrical rubber block 18 which is interposed between the first metal support 10 and second support structure 12. The rubber block 18 has an upper half having a truncated conical shape in cross section, and a substantially cylindrical lower half having a constant inner diameter. The upper half of the rubber block 18 is secured by vulcanization at its small-diameter end portion to the first metal support 10, while the lower half is secured also by vulcanization to the inner surface of the cylindrical support member 14 of the second support structure 12. Thus, the first metal support 10 and second metal support structure 12 are elastically connected via the rubber block 18.

The first metal support 10 is provided with a mounting bolt 20, which extends from the outer end face of the support 10 in a direction away from the rubber block 18, while the dished protective member 16 of the second support structure 12 is provided at its radially central part with another mounting bolt 22, which extends outwardly from the protective member 16. The engine mount is attached by the mounting bolt 20 to one of a body of the vehicle and a power unit of the vehicle including an engine, and to the other by the mounting bolt 22. Thus, the instant engine mount is adapted to mount the engine or the power unit to the vehicle body, in such a manner as to absorb and damp vibrations applied to the engine or the power unit. As shown in FIG. 1, the engine mount further includes a reinforcing metal 24 having a tapered annular shape, which is embedded in an axially intermediate portion of the rubber block 18.

The second support structure 12 serves to support a closure member in the form of a flexible rubber diaphragm 26. The diaphragm 26 has an outer peripheral portion which is fluid-tightly gripped by the flanges 15, 17 of the cylindrical support member 14 and dished protective member 16, as shown in FIG. 1. Thus, the diaphragm 26 cooperates with the first metal support 10 and the rubber block 18 to define a fluid chamber maintained in a fluid-tight condition. The fluid chamber is filled with a suitable non-compressible fluid such as water, polyalkylene glycol or silicone oil. Between the diaphragm 26 and the dished protective member 16 is provided an air chamber 27 for permitting the diaphragm 26 to expand toward the dished protective member 16.

The second support structure 12 further functions as support means for retaining a partition device 32 which consists of an outer partition member 28 and an inner partition member 30. The outer peripheral portions of the outer and inner partition members 28, 30 are retained by the flanges 15, 17 of the cylindrical support member 14 and dished protective member 16, via the outer peripheral portion of the rubber diaphragm 26 and the lower end portion of the rubber block 18. The above-described fluid chamber which is substantially defined by the rubber diaphragm 26 and the rubber block 18 is divided by the partition device 32, into a pressure-receiving chamber 34 and an equilibrium chamber 36. More specifically, the outer partition member 28 cooperates with the rubber block 18 and the first metal support 10 to define the pressure-receiving chamber 34, while the inner partition member 30 cooperates with the rubber diaphragm 26 to define the equilibrium chamber 36. In a radially outer portion of the partition device 30, there is formed an annular restricted passage 38 which is defined between the outer and inner partition members 28, 30, for restricted fluid communication between the pressure-receiving and equilibrium chambers 34, 36.

Upon application of vibrations to the engine mount, the non-compressible fluid is caused to flow between the pressure-receiving and equilibrium chambers 34, 36, via the annular restricted passage 38. Described more particularly, based on resonance of the mass of the fluid in the annular restricted passage 38, the instant engine mount is capable of effectively damping input vibrations in a frequency range which is determined by the configuration and dimensions of the passage 38.

In the instant embodiment, the restricted passage 38 is tuned to a predetermined frequency value f1 in a low frequency range, so as to effectively damp vibrations having low frequencies, due to resonance of the mass of the fluid in the restricted passage 38. Thus, the instant engine mount can exhibit excellent damping characteristic for low frequency vibrations such as an engine shake.

In a radially inner portion of the partition device 32, there is formed a generally flat space 44 having a suitable thickness, which accommodates a movable plate 46 made of a rubber material. The movable plate 46 is supported displaceably in the load-receiving direction. The generally flat space 44 defined between bottom walls of the outer and inner partition members 28, 30 of the partition device 32 communicates with the pressure-receiving chamber 34 and the equilibrium chamber 36, through respective sets of holes 40, 42 formed in the two members 28, 30. The movable plate 46 is disposed perpendicularly to the load-receiving direction so as to prevent free fluid communication between the pressure-receiving and equilibrium chambers 34, 36 through the holes 40, 42.

When a vibrational load is applied to the engine mount, a pressure difference occurs between the pressure-receiving chamber 34 and the equilibrium chamber 36, whereby the movable plate 46 is displaced in a direction to absorb the pressure difference. As a result, the non-compressible fluid is caused to flow through the holes 40 formed in the outer partition member 28. In this manner, the instant engine mount can effectively isolate input vibrations in a frequency range which is determined by the configuration and dimensions of the holes 40 and/or the size of the movable plate 46, due to resonance of the mass of the fluid in the holes 40.

In the present embodiment, the movable plate 46 (the holes 40) is tuned to a predetermined frequency value f2 in an intermediate frequency range, so as to effectively isolate input vibrations having intermediate frequencies, based on the movement of the movable plate 46. Thus, the instant engine mount can exhibit excellent isolating characteristic for the intermediate frequency vibrations such as those caused by idling of the engine.

The engine mount according to the present invention further has an operating device 48 which is fixedly supported by the first metal support 10. The operating member 48 extends form the small-diameter end surface of the first metal support 10 into the pressure-receiving chamber 34, such that the pressure-receiving chamber 34 is divided by the operating device 48 into a first section 34a formed on the side of the first metal support 10, and a second section formed on the side of the partition device 32. Between the operating device 48 and the inner wall of the pressure-receiving chamber 34 (inner wall surface of the rubber block 18), there is provided an annular restricted portion 50.

Described more specifically, the operating device 48 is constituted by a cup-shaped member 54 having an opening 52 which is open toward the partition device 32. The cup-shaped member 54 consists of a fixing portion 56a secured at its one end to the first metal support 10, and a cup-shaped portion 56b integral with the fixing portion 56a. The fixing portion 56a extends from a radially central part of a bottom wall of the cup-shaped portion 56b, in a direction away from the partition device 32. Thus, the operating device 48 is co-axially attached to the first metal support 10. In this arrangement, the pressure-receiving chamber 34 is divided by the cup-shaped member 54 of the operating device 48, into the first section 34a formed on the side of the first metal support 10 and the second section 34b formed on the side of the partition device 32. The annular restricted portion 50 described above is defined by and between an outer circumferential surface of the cylindrical wall of the cup-shaped portion 56a of the cup-shaped member 54, and a portion of the inner circumferential surface of the cylindrical support member 14 of the second support structure 12.

Before the engine mount is installed on the vehicle body, the cup-shaped portion 56b of the cup-shaped member 54 is in contact with the inner surface of the rubber block 18, as shown in FIG. 1. However, when the engine or power unit of the vehicle is installed on the vehicle body via the engine mount, the cup-shaped portion 56b of the cup-shaped member 54 is moved away from the inner surface of the upper half of the rubber block 18, whereby the first and second sections 34a, 34b of the pressure-receiving chamber 34 communicate with each other, through the restricted portion 50 described above. With the engine or power unit installed in place, the vibrations applied (from the vehicle body) to the engine mount cause the non-compressible fluid existing in the pressure-receiving chamber 34 to flow between the first and second sections 34a and 34b, through the restricted portion 50. Thus, the instant engine mount is capable of effectively isolating the applied vibrations in a frequency range which is determined by the dimensions of the restricted portion 50, due to resonance of the mass of the fluid in and near the restricted portion 50.

In the present embodiment, the annular restricted portion 50 is tuned to a predetermined frequency value f3 in the neighborhood of 320 Hz. Accordingly, the engine mount can exhibit excellent isolating characteristic for the input vibrations having frequencies of around 320 Hz, such as sounds transmitted through the vehicle engine, due to resonance of the mass of the fluid flowing through the restricted portion 50.

The operating device 48 is provided with an elastic member in the form of an annular rubber member 58 such that the rubber member 58 is supported by the cup-shaped member 54 of the device 48. Described more precisely, the annular rubber member 58 is fluid-tightly press-fitted in the opening end of the cup-shaped member 54, via a retainer ring 64 secured by valcanization to the outer circumferential surface of the rubber member 58. To the inner circumferential surface of the rubber member 58 is secured a metal ring 62 by valcanization. The metal ring 62 thus elastically supported by the rubber member 58 serves as a resonance member having a suitable mass, and has a round hole 60 which is tuned to a predetermined frequency of vibrations. Thus, the annular rubber member 58 and the metal ring 62 cooperate with each other to close the above-described opening 52 of the cup-shaped member 54 and define a cavity 52a which constitutes a part of the second section 34b of the pressure-receiving chamber 34.

In the bottom wall of the cup-shaped member 54 of the operating device 48, there is formed a plurality of through holes 57 (one of which is shown in FIG. 1). The through holes 57 are tuned to a certain frequency which is higher or equal to the frequency determined by the round hole 60 of the metal ring 62. Upon application of the vibrations to the thus constructed engine mount, the non-compressible fluid existing in the pressure-receiving chamber 34 is caused to flow between the first and second sections 34a, 34b of the chamber 34, through the through holes 57, cavity 52a, and the round hole 60 of the metal ring 62.

In the instant embodiment as described above, the restricted fluid flows through the round hole 60 of the metal ring 62 provide a resonant phenomenon, while the metal ring 62 itself supported by the rubber member 58 serves as a resonance member. That is, the resonance of the fluid flowing through the round hole 60 and the resonance of the metal ring 62 give a synergistic effect to isolate the input vibrations having frequencies in the neighborhood of a resonance frequency f4 which is determined by the resonance frequencies of the round hole 60 and the metal ring 62. In this embodiment, the round hole 60 and the metal ring 62 are tuned so as to isolate the vibrations at frequencies in the neighborhood of 200 Hz, such as booming noises.

It is to be understood from the above description that the round hole 60 of the metal ring 62 serves as first communication means for fluid communication between the cavity 52a and the second section 34b of the pressure-receiving chamber 34. On the other hand, the plurality of through holes 57 serve as second communication means for fluid communication between the cavity 52a and the first section 34a of the pressure-receiving chamber 34.

In FIG. 1, reference numeral 66 denotes a rubber layer secured by valcanization to the cup-shaped member 54 of the operating device 48. More precisely described, the rubber layer 66 has a L-shaped cross section, and is secured to the end face of the cup-shaped member 54 and a part of the outer circumferential surface of the same adjacent to the end face. In the engine mount of the instant embodiment, the operating device 48 is also adapted to prevent an excessive amount of relative displacement of the first metal support 10 and second support structure 12 in the load-receiving direction, based on the the abutting contact of the operating device 48 and the partition member 32, via the rubber member 66.

In the thus constructed engine mount, the input vibrations of frequencies in the neighborhood of the value f1 determined by the annular restricted passage 38, that is, the low frequency vibrations such as the engine shake, can be effectively damped, based on the restricted fluid flows through the restricted passage 38. Simultaneously, the engine mount can effectively isolate the input vibrations of frequencies in the neighborhood of the value f2 determined by the movable plate 46, that is, the intermediate frequency vibrations such as those caused by idling of the engine, based on the movement (displacement) of the movable plate 46 in the load-receiving direction. Thus, the instant engine mount can provide vibration damping and isolating functions similar to those provided in the known fluid-filled engine mount.

According to the present embodiment, the engine mount further exhibits excellent isolating characteristics for the vibrations such as the booming noise, in the frequency range in the neighborhood of the resonance frequency f4 around 200 Hz, which is set higher than the frequency value f2 determined by the movable plate 46. This vibration isolating is accomplished by the engine mount, based on the synergistic effect of the resonance of the mass of the fluid flowing through the round hole 60 of the metal ring 62, and the resonance of the metal ring 62. Further, the instant engine mount can effectively isolate the vibrations such as the engine-transmitted sounds, in the frequency range in the neighborhood of the predetermined value f3 around 320 Hz, based on the restricted fluid flows through the restricted portion 50 defined between the cup-shaped member 54 of the operating device 48 and the inner wall of the pressure-receiving chamber 34. It is to be noted that the frequency value f3 is set to be higher than the resonance frequency f4.

The engine mount of the present embodiment as described hitherto can exhibit excellent damping and isolating characteristics for the input vibrations in four different frequency ranges, while assuring the vibration damping or isolating capability as given by the known engine mount. In particular, the engine mount has improved isolating capability for the vibrations whose frequencies are higher than the frequency value f2 determined by the movable plate 46. Thus, the instant engine mount can demonstrate far more excellent vibration damping and isolating characteristics, as compared with the known engine mount.

Referring next to FIG. 2, there is illustrated a graph showing the relationship between the absolute spring constant (absolute value of complex spring constant) of the engine mount and the frequency of vibrations applied to the mount. It can be recognized from the graph of FIG. 2 that the engine mount of the instant embodiment can effectively isolate the vibrations of frequencies around the value f3 which is determined by the restricted portion 50, and the vibrations of frequencies around the resonance frequency f4 which is determined by the metal ring 62 and the round hole 60 of the ring 62.

While the presently preferred embodiment has been described, for illustrative purpose only, it is to be understood that the invention is not limited to the precise details of the illustrated embodiment.

In the illustrated embodiment, the frequency value f3 to which the restricted portion 50 is tuned is set to be higher than the resonance frequency f4 determined based on the resonance effects caused by the fluid flows through the round hole 60 of the metal ring 62, and the metal ring 62 itself. However, it is possible to set the resonance frequency f4 to be higher than the frequency value f3. FIG. 3 shows an example of the relationship between the absolute spring constant of the engine mount and the frequency of vibrations applied to the mount, wherein the resonance frequency f4 is higher than the frequency value f3. It is easily understood from the graph of FIG. 3 that the engine mount as arranged above can also exhibit excellent isolating characteristics for the input vibrations of frequencies in the neighborhood of the frequency values f3, f4, even if the resonance frequency f4 is set to be higher than the frequency value f3.

Further, the engine mount of the illustrated embodiment employs the movable plate 46 as a movable member such that the plate 46 is displaceable (movable) by a suitable amount in the load-receiving direction, in order to absorb the fluid-pressure difference between the pressure-receiving chamber 34 and the equilibrium chamber 36. However, it is possible to employ a flexible member such as a diaphragm, which is deformable in such a direction as to absorb the above-described pressure difference between the two chambers 34, 36.

Further, the present invention is applicable to mounting structures other than the engine mount for the motor vehicle.

It will be understood that the invention may be embodied with various other changes, modifications and improvements which may occur to those skilled in the art, without departing from the spirit and scope of the invention defined in the following claims.

What is claimed is:

1. A fluid-filled elastic mount for flexible coupling of two members, comprising:
   first support means and second support means which are spaced apart from each other in a load-receiving direction in which a vibrational load is applied to the elastic mount;
   an elastic body interposed between said first and second support means, for elastic connection of said first and second support means;
   a closure member secured to said second support means and cooperating with at least said elastic body to define a fluid chamber filled with a non-compressible fluid, said closure member including a flexible portion;
   partition means for dividing said fluid chamber into a pressure-receiving chamber formed on the side of said first support means, and an equilibrium chamber formed on the side of said second support means;
   means for defining a restricted passage for restricted fluid communication between said pressure-receiving and equilibrium chambers;
   a moveable member which is supported deformably or displaceably in a direction to absorb a pressure difference between said pressure-receiving and equilibrium chambers; and
   an operating device including a cup-shaped member which has an opening and which is fixedly supported by said first support means such that said opening is open toward said partition means, said cup-shaped member dividing said pressure-receiving chamber into a first section formed on the side of said first support means and a second section formed on the side of said partition means, said cup-shaped member cooperating with an inner wall surface of said elastic body to define an annular restricted portion which communicates with said first and second sections, said operating device further including an elastic member supported by said cup-shaped member, and a resonance member elastically supported by said elastic member, said elastic and resonance members closing said opening to thereby define a cavity which constitutes a part of said second section, said resonance member having first communication means for fluid communication between said cavity and said second section, and said cup-shaped member having second communication means for fluid communication between said cavity and said first section.

2. A fluid-filled elastic mount according to claim 1, wherein said operating device further comprises a retainer member through which said elastic member is supported by said cup-shaped member.

3. A fluid-filled elastic mount according to claim 1, wherein said first partition means incorporates said means for defining a restricted passage for restricted fluid communication between said pressure-receiving and equilibrium chambers.

4. A fluid-filled elastic mount according to claim 3, wherein said partition means comprises two partition members which cooperate with each other to define said restricted passage.

5. A fluid-filled elastic mount according to claim 3, wherein said partition means comprises two partition members which define a generally flat space in which said movable member is accommodated movably in said load-receiving direction.

6. A fluid-filled elastic mount according to claim 1, wherein said cup-shaped member includes a fixing portion secured to said first support means, and a cup-shaped portion supported by said fixing portion, said cup-shaped portion having a bottom wall which cooperates with said fixing portion and said elastic body to define said first section of said pressure-receiving chamber, said bottom wall having said second communication means.

* * * * *

UNITED STATES PATENT AND TRADEMARK OFFICE
CERTIFICATE OF CORRECTION

PATENT NO. : 4,826,126
DATED : May 2, 1989
INVENTOR(S) : Motohiro KATAYAMA and Tatsuya SUZUKI It is certified that error appears in the above-identified patent and that said Letters Patent is hereby corrected as shown below:

Item [75] Inventors, should read as follows:

[75] Inventors: Motohiro Katayama, Kasugai;
Tatsuya Suzuki, Komaki, both of
Japan

Signed and Sealed this

Second Day of January, 1990

*Attest:*

JEFFREY M. SAMUELS

*Attesting Officer*     *Acting Commissioner of Patents and Trademarks*